United States Patent
Gehring

(10) Patent No.: US 10,341,165 B2
(45) Date of Patent: Jul. 2, 2019

(54) CAN TRANSMITTER WITH FAST CANL CONTROL LOOP

(71) Applicant: Microchip Technology Incorporated, Chandler, AZ (US)

(72) Inventor: Burkhard Gehring, Heilbronn (DE)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 15/986,045

(22) Filed: May 22, 2018

(65) Prior Publication Data

US 2018/0343161 A1 Nov. 29, 2018

Related U.S. Application Data

(60) Provisional application No. 62/510,227, filed on May 23, 2017.

(51) Int. Cl.
*H04L 12/40* (2006.01)
*H04L 29/08* (2006.01)

(52) U.S. Cl.
CPC .......... *H04L 29/0854* (2013.01); *H04L 12/40* (2013.01); *H04L 12/40032* (2013.01); *H04L 67/1095* (2013.01); *H04L 2012/40215* (2013.01)

(58) Field of Classification Search
CPC ........... H03H 11/30; H03K 19/018571; H03K 19/00346; H04L 25/0272; H04L 12/40; H04L 67/1095; H04L 29/0854; G06F 13/4072; G06F 13/42; G06F 13/4068
See application file for complete search history.

(56) References Cited

U.S. PATENT DOCUMENTS

| | | | |
|---|---|---|---|
| 7,183,793 B2 * | 2/2007 | Jordanger | H03K 19/00346 326/26 |
| 9,502,889 B2 * | 11/2016 | Yang | H02H 9/02 |
| 2004/0043739 A1 * | 3/2004 | Jordanger | H04B 3/30 455/302 |
| 2005/0017762 A1 * | 1/2005 | Gregorius | H04L 25/028 327/65 |
| 2006/0170451 A1 | 8/2006 | Jordanger et al. | 326/34 |
| 2014/0320229 A1 | 10/2014 | Ali | 333/17.3 |
| 2017/0063352 A1 * | 3/2017 | Chang | H03K 5/003 |
| 2017/0063354 A1 * | 3/2017 | Chang | H03K 5/01 |

FOREIGN PATENT DOCUMENTS

WO 2006/133731 A1 10/2008 ............. H04L 25/02

OTHER PUBLICATIONS

International Search Report and Written Opinion, Application No. PCT/US2018/034068, 11 pages, dated Oct. 18, 2018.

* cited by examiner

*Primary Examiner* — Khanh C Tran
(74) *Attorney, Agent, or Firm* — Slayden Grubert Beard PLLC

(57) ABSTRACT

A controller area network (CAN) transmitter includes an output stage circuit, a replica circuit of the output stage circuit configured to produce a replica signal, and a control amplifier configured to control a CANL output signal of the CAN transmitter in order to maintain the replica signal at a desired level.

18 Claims, 2 Drawing Sheets

CAN TRANSMITTER WITH FAST CANL CONTROL LOOP

PRIORITY APPLICATION

This application claims priority to U.S. Provisional Application No. 62/510,227, filed May 23, 2017, the contents of which are hereby incorporated in their entirety.

TECHNICAL FIELD

The present disclosure relates to controller area network (CAN) control and, in particular, a CAN transmitter with a fast CANL control loop.

BACKGROUND

CAN is defined in the International Standards Organization (ISO) 11898 specification. ISO 11898 is a family of specifications in which ISO11898-1 covers a datalink layer while ISO 118980-2 and ISO 118980-3 cover physical layers of CAN. CAN is a robust communication protocol. A CAN node on a bus may detect errors in a received message, and force the message to be destroyed and retransmitted. Accordingly, the message that a node does receive contains valid data. A CAN frame requires that every node acknowledge the message before it can be processed by that node. This acknowledge can only come after various error condition checks, such as a 15-bit cyclical redundancy check (CRC) on the message. If one CAN node finds an error with the message, the message is destroyed and retransmitted.

The CAN specification defines three different error states for a CAN node to be in, with each error state giving the CAN node different levels of bus access. The error states limit faulty nodes from taking down the CAN bus.

CAN includes serial communication in which all nodes on the CAN bus are attached to common connection using the same bitrate. CAN is message-based, rather than address-based. Thus, messages are not transmitted from one node to another node based on the address of a CAN node. Instead, a CAN node will broadcast its message to all nodes on the bus. The receiving node is required to determine whether it should act on that message. Single or multiple nodes may act on the same data. Accordingly, it is possible to add new nodes to a CAN bus without having to update the existing nodes with addressing information CAN allows for distributed control across a network because of the reliability of the data. This allows designers the of the network the flexibility to set up consumer-producer or peer-to-peer networks.

CAN network transmission may be performed using a differential pair of transmission lines—CANH and CANL. CAN may specify two logical states: recessive and dominant. During the recessive logical state, CANH and CANL may be approximately the same voltage, or within a specified tolerance of voltage from each other. During the dominant logical state, CANH and CANL may be separated by a voltage difference, VDiff. FIG. 1 illustrates an example differential bus using CAN, including CANH, CANL, and VDiff.

In the recessive state (i.e., logic '1' on an input of a CAN transceiver or module) the differential voltage on CANH and CANL is less than the minimum threshold (<0.5V receiver input or <1.5V transmitter output). In the dominant state (i.e., logic '0' on the input of a CAN transceiver or module), VDiff is greater than the minimum threshold. A dominant bit overdrives a recessive bit on the bus to achieve nondestructive bitwise arbitration.

SUMMARY

Embodiments of the present disclosure include a CAN transmitter. The CAN transmitter may include an output stage circuit, a replica circuit of the output stage circuit configured to produce a replica signal, and a control amplifier configured to control a CANL output signal of the CAN transmitter in order to maintain the replica signal at a desired level. In combination with any of the above embodiments, the control amplifier may be further configured to control a low side of the output stage circuit to generate the CANL output signal. In combination with any of the above embodiments, the control amplifier may be further configured to provide no control over a CANH output signal of the CAN transmitter. In combination with any of the above embodiments, the control amplifier may be further configured to bias transistors for the CANL output signal of the CAN transmitter during dominant states and during recessive states. In combination with any of the above embodiments, the output stage circuit may include a CANL driver including a lateral double-diffused NMOS transistor and a freewheeling diode. In combination with any of the above embodiments, the replica circuit may include two resistors configured to model a CAN bus load. In combination with any of the above embodiments, a center node of the two resistors may be connected as input to the control amplifier. In combination with any of the above embodiments, the control amplifier may be further configured to control a gate voltage of an NMOS transistor of a CANL driver of the output stage circuit in order to maintain the replica signal at a desired level. In combination with any of the above embodiments, the replica circuit may be less than 30% of the size of the output stage circuit. In combination with any of the above embodiments, the control amplifier may be further configured to perform active feed-forward for compensating common mode game of the transmitter. In combination with any of the above embodiments, the CAN transmitter may further include gate discharge switches coupled to gates of transmitters of the output stage circuit and the replica circuit.

Embodiments of the present disclosure may include a system, controller, integrated circuit device, or microcontroller including any of the CAN transmitters of the above embodiments.

Embodiments of the present disclosure may include methods performed by any of the CAN transmitters, systems, controllers, integrated circuit devices, or microcontrollers of the above embodiments.

DETAILED DESCRIPTION

Figure 2:
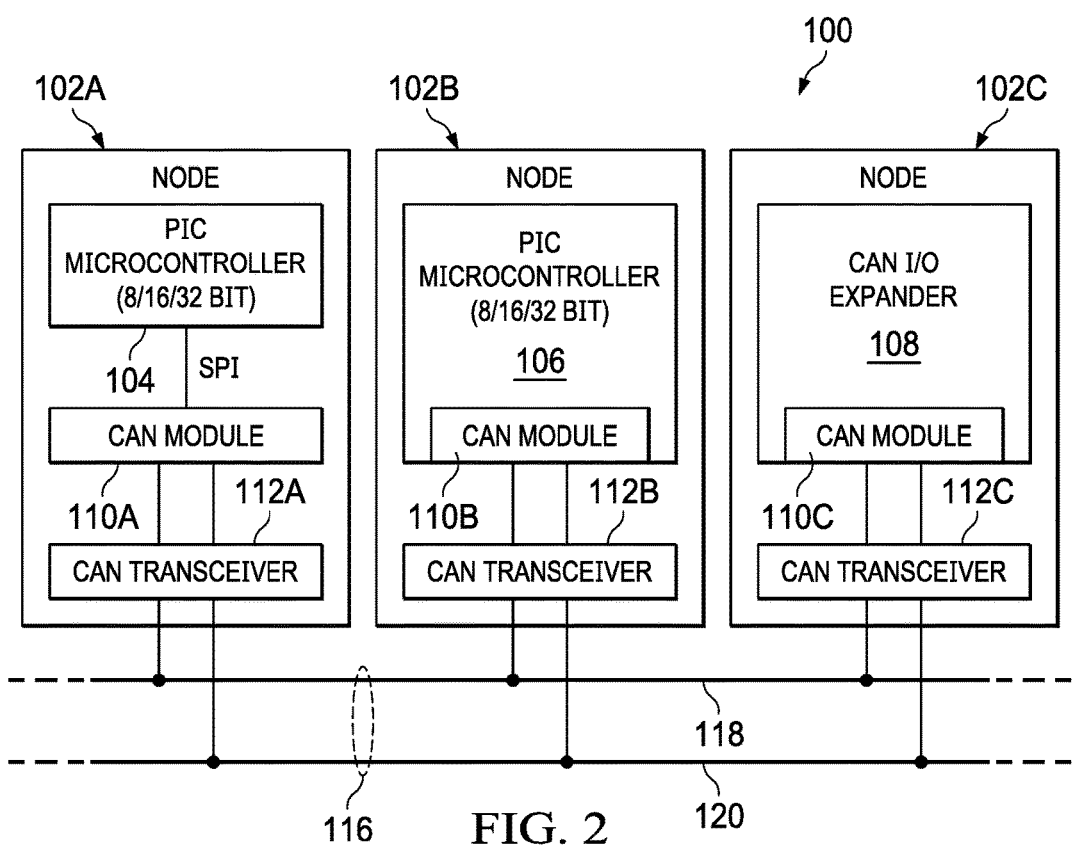
FIG. 2 is an illustration of an example CAN network, according to embodiments of the present disclosure.

FIG. 2 is an illustration of an example CAN network 100, according to embodiments of the present disclosure. Network 100 may include any suitable number and kind of CAN nodes 102. For example, network 100 may include nodes 102A, 102B, 102C. Nodes 102 may be configured to communicate with each other over a CAN bus 116. CAN bus 116 may be implemented with two lines. For example, CAN bus 116 may include a CANH line 120 and a CANL line 118.

Nodes 102 may be implemented in any suitable manner. FIG. 2 illustrates example variations of CAN node implementations. For example, CAN node 102A may be implemented with a microcontroller 104. Microcontroller 104 may be implemented by, for example, an 8-bit, 16-bit, or 32-bit PIC microcontroller from the assignee of the present disclosure. Microcontroller 104 might not include an integrated CAN module. Accordingly, CAN node 102A might include a separately implemented CAN module 110A.

CAN modules 110 in network 100 may be configured to provide an interface between a CAN transceiver 112 and the rest of CAN node 102. CAN modules 110 may be implemented by any suitable mechanism, such as by libraries, software stacks, functions, applications, drivers, or instructions for execution by a processor. CAN transceivers 112 may be implemented in any suitable manner, such as by analog circuitry, digital circuitry, instructions for execution by a processor, or any suitable combination thereof. CAN modules 110 may make function calls of CAN transceivers 112 to send and receive data, or otherwise carry out the CAN protocol. Other elements of CAN nodes 102 may in turn make function calls of CAN modules 110. For example, software running on microcontroller 110A may communicate with other nodes by making function calls to CAN module 110A, which in turn may make function calls to CAN transceiver 112A. CAN transceiver 112A may read and write data over CAN bus 116 to or from other CAN nodes 102.

CAN node 102A may include microcontroller 110A that does not include an integrated CAN module 110A. CAN node 102B may include a microcontroller 110B that includes an integrated CAN module 110B. CAN node 102C may be implemented as a CAN input/output (I/O) expander. CAN node 102C may provide I/O expansion for CAN network 100 without a microcontroller. CAN node 102C may include peripherals such as general-purpose IO, A2D, pulsed-width modulation, or other interfaces to send out periodic or event-based messages driven on thresholds.

A number of challenges may be encountered when implementing CAN network 100. For example, CAN system development may encounter electromagnetic compatibility (EMC) issues such as electromagnetic interference (EMI) or electromagnetic environment (EME). In CAN, differential communication must be required to work despite EMI. Such digital communication may include operations even over a large common mode range of +/−12V. Furthermore, such digital communication may include operating with up to 36 dBm (40V peak) injected radio frequency (RF) power. Furthermore, CAN must work in EMEs such as up to 55 dBμV (0.6 mV) common mode emissions up to 20 MHz, up to 15 dBμV (6 μV) common mode emissions at 75 MHz, and at a 2V differential signal amplitude. Furthermore, CANL and CANH currents may need to match each other with extremely accuracy, both at DC and transient.

Figure 1:
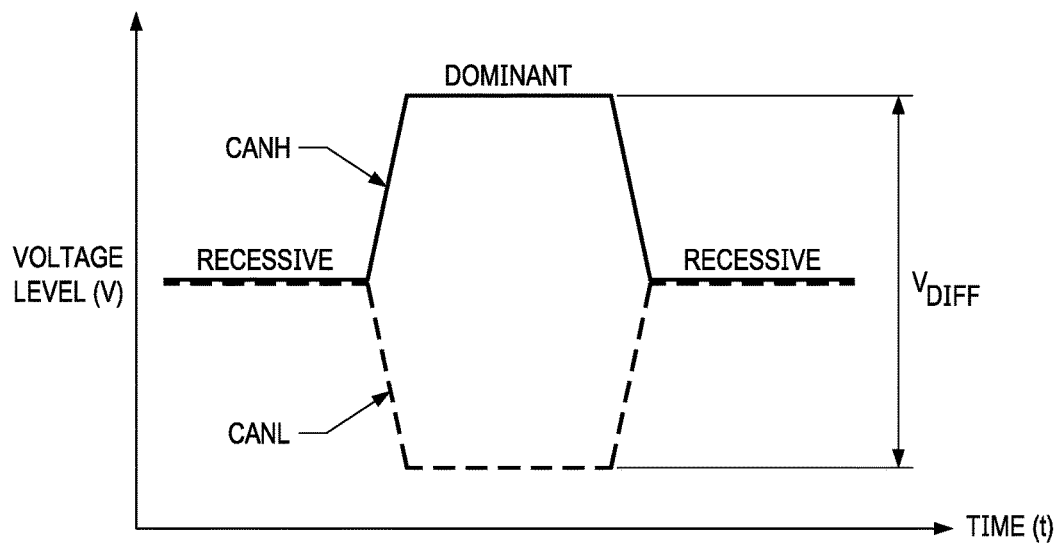
FIG. 1 is an illustration of example CAN signaling.

Referring to FIG. 1, a given CAN node may exercise slow or fast control to generate CANH or CANL signals at a transceiver. The "fast" or "slow" aspect may refer to the speed of a control loop to generate an appropriate dominant or recessive signal. In particular, the "fast" or "slow" aspect of CANH or CANL control may refer to the slope of the change in signals between the recessive and the dominant states, or between the dominant and the recessive states. The slope may also be referred to as the slew rate of the signal transition. Faster rise and fall times may support higher bus rates and longer bus lengths in network 100.

Figure 3:
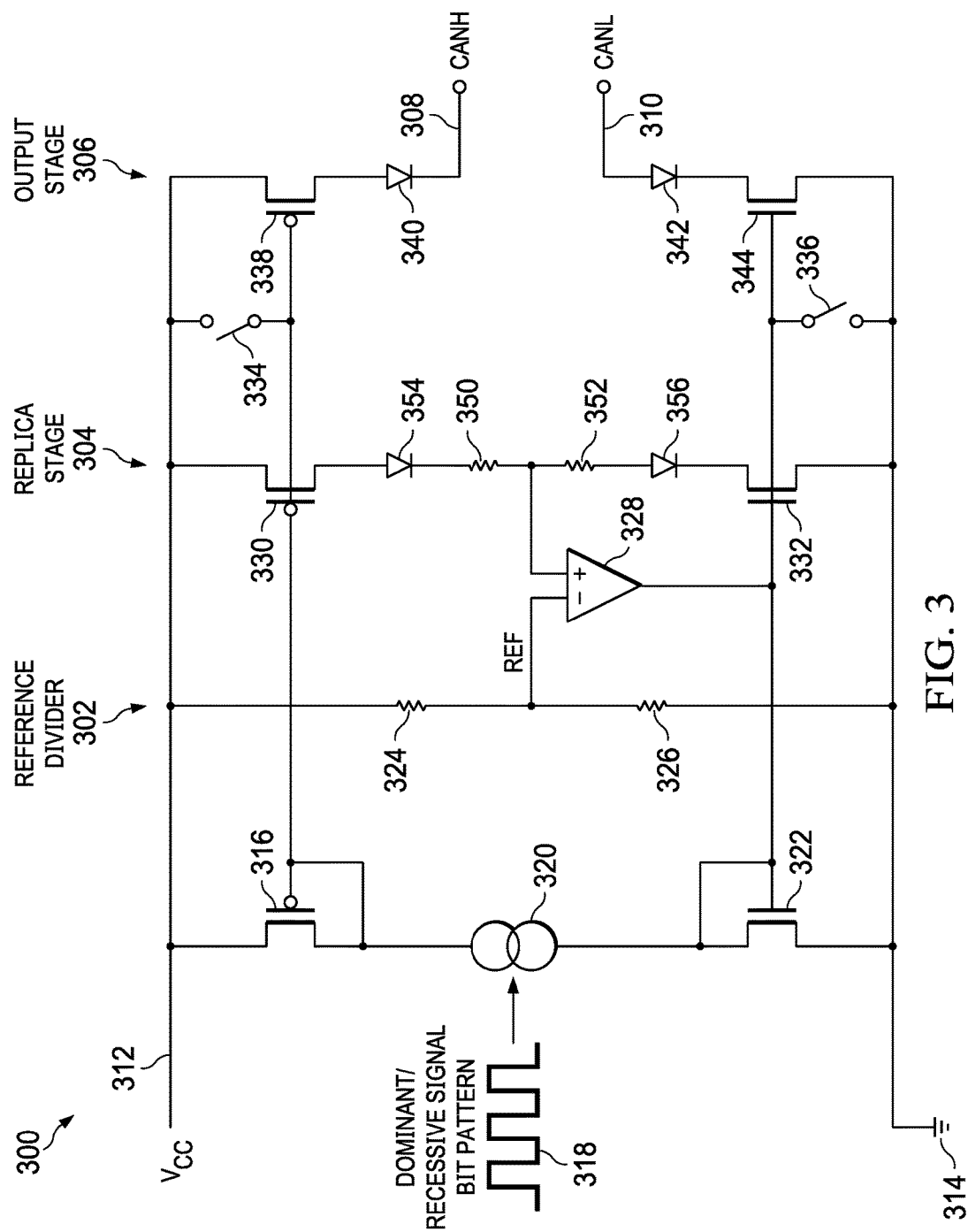
FIG. 3 is an illustration of an example CAN transceiver, according to embodiments of the present disclosure.

FIG. 3 illustrates a more detailed view of a CAN transceiver 300, according to embodiments of the present disclosure. Transceiver 300 may implement in part transceivers 112 of FIG. 2. Transceiver 300 may receive a signal 318 from other parts of the transceiver (not shown) or a CAN module 110. Signal 318 may be a dominant or recessive logic signal signifying a bit pattern of values to be written to CAN network 100. The output dominant or recessive signal may be written to CANH 308 or CANL 310 pins. CANH and CANL 310 pins may be connected to CANH line 118 and CANL line 120, respectively. Transceiver 300 may be configured to perform faster rise and fall times for writing recessive or dominant states to CANH 308 and CANL 310 pins compared to other solutions.

Transceiver 300 may include a current source 320 connected to signal 318. Signal 318 may be configured to drive output of current source 320 according to the received bit pattern. Current source 320 may be implemented in any suitable manner. In one embodiment, current source 320 may be a floating current source. Current source 320 may be a programmable or adjustable current source based upon the input of signal 318. An injection bit pattern may be provided from into current source 320 into current mirrors. The current mirrors may include a replica stage 304 and an output stage 306.

In a first stage, an input stage, VCC 312 may be connected to transceiver 300. Ground 314 may be connected to transceiver 300. VCC 312 may be connected to the source of a transistor 316. Transistor 316 may be a p-type metal-oxide-semiconductor (PMOS) transistor. Current source 320 may be connected to the drain of transistor 316. Current source 320 may be connected to the source of another transistor 322. Transistor 322 may be an n-type metal-oxide-semiconductor (NMOS) transistor. Furthermore, current source 320 may be connected to the gate of transistor 322. The drain of transistor 322 may be connected to ground 314.

Transceiver 300 may include a replica stage 304. Replica stage 304 may include a transistor 330 connected to VCC 312. Transistor 330 may be a PMOS transistor. Transistor 330 may be connected to VCC 312 at its source. The gate of transistor 330 may be connected to the gate of transistor 316. The drain of transistor 330 may be connected to a diode 354. Diode 354 may be connected to a resistor 350, which may be connected to another resistor 352. Resistor 352 may be connected to a diode 356. Diode 356 may be connected to the source of a transistor 332. The drain of transistor 332 may be connected to ground 314. Diodes 356, 354 may be freewheeling diodes. The gate of transistor 332 may be connected to the gate of transistor 322. Transistor 332 may be an NMOS transistor.

Transceiver 306 may include an output stage 306. Output stage 306 may include a transistor 338 connected at its source to VCC 312. In one embodiment, transistor 338 may be lateral double-diffused PMOS (LDPMOS) transistor. In another embodiment, transistor 338 may be a PMOS transistor with an LDPMOS cascode. Transistor 338 may be connected at its gate to the gate of transistor 330 and the gate of transistor 316. Transistor 338 may be connected at its drain to a diode 340. Diode 340 may be connected to CANH pin 308. CANL pin 310 may be connected to a diode 342. Diode 342 may be connected to the source of a transistor 344. The gate of transistor 344 may be connected to the gate of transistor 332 and the gate of transistor 322. The drain of transistor 344 may be connected to ground 314. In one embodiment, transistor 344 may be lateral double-diffused NMOS (LDNMOS) transistor. Such a transistor may be used if a cascode current mirror in compliance with the CAN specification is not used. In another embodiment, transistor 344 may be a PMOS transistor with an LDNMOS cascode. Diodes 340, 342 may be freewheeling diodes. Diodes 340, 342 may be used for ESD protection and for reverse protection.

In one embodiment, transceiver 306 may include a control amplifier 328. Output of amplifier 328 may be connected to the gate of transistor 344. Moreover, output of amplifier 328 may be connected to the gates of transistors 322, 332. Amplifier 328 may be implemented by, for example, a 1-stage, 2-stage, or 3-stage operational amplifier. In a further embodiment, amplifier 328 may receive inputs from a reference divider 302 and from replica stage 304. For example, amplifier 328 may receive a negated input from reference divider 302 and a positive input from replica stage 304, or vice-versa.

Reference divider 302 may be connected to VCC 312. Reference divider 302 may include two resistors 324, 326. Resistor 326 may be connected to ground 314. The values of resistors 324, 326 may be the same. Reference divider 302 may provide a reference voltage to amplifier 328 from a node between resistors 324, 326.

Input from replica stage 304 to amplifier 328 may be provided from a node between resistors 350, 352. The value of resistors 350, 352 may be the same. Any suitable value of resistance may be used in resistors 324, 326, 350, 352. Reference divider 302 may be a total of 110 ohms. Resistors 350, 352 may be, for example, six times higher than an output CAN bus resistor. Such a CAN bus resistor may be, for example, 60 ohms.

In one embodiment, a switch 334 may be provided between VCC 312 and the gates of transistors 338, 330, 16. Switch 334 may be optional. In another embodiment, a switch 336 may be provided between ground 314 and the gates of transistors 344, 332, 322. Switch 336 may be optional, as control provided by transistors in FIG. 3 may perform an equivalent function. Switches 334, 336 may be driven by bit pattern 318. Hard switching may use current sources. In contrast, switches 334, 336 may be driven with bit pattern 318.

Replica stage 304 may be a fraction of the size or of the current of output stage 306. The fraction may be, for example, 1/10 to 1/3 of the current of output stage 306. In one embodiment, 1/6 of the output state current may be used. Replica stage 304 may be configured to produce a replica signal. The replica signal may detect the difference in CANH and CANL current changes. The replica signal may be an estimate of the common mode signal that is to be applied to the CAN bus over CANH pin 308 and CANL pin 310. The replica signal may be provided to amplifier 328. Amplifier 328 may in turn be configured to maintain the replica signal at a desired level. The desired level may be expressed by a reference voltage provided by reference divider 302. In particular, amplifier 328 may be configured to maintain the replica signal by controlling the signal on CANL pin 310. The replica signal generated by replica stage 304 may be controlled by applying the output of amplifier 328 to the gate of transistor 332.

Replica stage 304 may be implanted as a reduced size (such as 1-30%) of output stage 306. Replica stage 304 may include a model of the bus load on CAN network 100. Such a model may be implemented by, for example, resistors 326, 330. The center tap of resistors 326, 330 may be used for input or feedback to amplifier 328. Amplifier 328 may control the gate voltage of transistor 344. Transceiver 300 may thus use active feed-forward for compensating and stabilizing the control loop to generate CANL pin 310 signals. Transceiver 300 may use a constant voltage, such as 2.5V, as a target for replica voltage. Transceiver 300 may use a certain ratio, such as 50%, as a target for replica voltage. This may be implemented by reference divider 302.

Transceiver 300 may provide advantages over slower CANH and CANL control. Transceiver 300, by using a control circuit including amplifier 328 and its connections shown in FIG. 3, may provide advantages over use of hard switching to generate CANH and CANL signals. Without hard switching, high frequency emissions may be reduced. Other solutions may use a switch to switch between dominant and recessive generation of signals for CANH and CANL.

During CANL control, slow CANH control may be deactivated. In one embodiment, only the CANL signals may be controlled (using NMOS transistor 344), as opposed to controlling both NMOS and PMOS (transistor 338) by amplifier 328. This may result from PMOS mirrors operating slower than NMOS mirrors. Accordingly, the NMOS capacitance of transistor 344, which is three times lower than that of PMOS (transistor 338), may yield faster control. In one embodiment, the control loop may be biased at all times. While the driver is active the fast control may be enabled. This may be accomplished by a separate supply current (not shown). In such a case, the control loop may be biased in both dominant and recessive states. This may provide a large bandwidth and accurate matching of low-side and high-side current.

What is claimed is:

1. A controller area network (CAN) transmitter, comprising:
   an output stage circuit;
   a replica circuit of the output stage circuit configured to produce a replica signal; and
   a control amplifier configured:
      to control a CANL output signal of the CAN transmitter in order to maintain the replica signal at a desired level;
      control a low side of the output stage circuit to generate the CANL output signal; and
      provide no control over a CANH output signal of the CAN transmitter.

2. The CAN transmitter of claim 1, wherein the control amplifier is further configured to bias transistors for the CANL output signal of the CAN transmitter during dominant states and during recessive states.

3. The CAN transmitter of claim 1, wherein the replica circuit includes two resistors configured to model a CAN bus load.

4. The CAN transmitter of claim 3, wherein a center node of the two resistors is connected as input to the control amplifier.

5. The CAN transmitter of claim 1, wherein the control amplifier is further configured to control a gate voltage of an NMOS transistor of a CANL driver of the output stage circuit in order to maintain the replica signal at a desired level.

6. The CAN transmitter of claim 1, wherein the replica circuit is less than 30% of the size of the output stage circuit.

7. The CAN transmitter of claim 1, wherein the control amplifier is further configured to perform active feed-forward for compensating common mode game of the transmitter.

8. A controller area network (CAN) transmitter, comprising:
an output stage circuit;
a replica circuit of the output stage circuit configured to produce a replica signal; and
a control amplifier configured to control a CANL output signal of the CAN transmitter in order to maintain the replica signal at a desired level;
wherein the output stage circuit includes a CANL driver including a lateral double-diffused NMOS transistor and a freewheeling diode.

9. A controller area network (CAN) transmitter, comprising:
an output stage circuit;
a replica circuit of the output stage circuit configured to produce a replica signal;
a control amplifier configured to control a CANL output signal of the CAN transmitter in order to maintain the replica signal at a desired level; and
gate discharge switches coupled to gates of transmitters of the output stage circuit and the replica circuit.

10. A method, comprising:
generating a replica signal from a replica circuit of an output stage circuit of a controller area network (CAN) transmitter;
with a control amplifier:
controlling a CANL output signal of the CAN transmitter in order to maintain the replica signal at a desired level;
controlling a low side of the output stage circuit to generate the CANL output signal; and
providing no control over a CANH output signal of the CAN transmitter.

11. The method of claim 10, further comprising biasing transistors for the CANL output signal of the CAN transmitter during dominant states and during recessive states.

12. A method, comprising:
generating a replica signal from a replica circuit of an output stage circuit of a controller area network (CAN) transmitter;
with a control amplifier, controlling a CANL output signal of the CAN transmitter in order to maintain the replica signal at a desired level; and
using a CANL driver to drive output, the CANL driver including an lateral double-diffused NMOS transistor and a freewheeling diode.

13. The method of claim 10, further comprising using two resistors configured to model a CAN bus load.

14. The method of claim 13, further comprising connecting a center node of the two resistors as input to the control amplifier.

15. The method of claim 10, further comprising controlling a gate voltage of an NMOS transistor of a CANL driver of the output stage circuit in order to maintain the replica signal at a desired level.

16. The method of claim 10, wherein the replica circuit is less than 30% of the size of the output stage circuit.

17. The method of claim 10, further comprising performing active feed-forward for compensating common mode game of the transmitter.

18. A method, comprising:
generating a replica signal from a replica circuit of an output stage circuit of a controller area network (CAN) transmitter;
with a control amplifier, controlling a CANL output signal of the CAN transmitter in order to maintain the replica signal at a desired level; and
operating gate discharge switches coupled to gates of transmitters of the output stage circuit and the replica circuit to generate output.

* * * * *